(12) United States Patent
Fowee

(10) Patent No.: US 6,336,058 B1
(45) Date of Patent: Jan. 1, 2002

(54) USE OF CONTROL MATRIX FOR BOILER CONTROL

(75) Inventor: Roger W. Fowee, Wheaton, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/563,085

(22) Filed: May 1, 2000

(51) Int. Cl.[7] .................... G05B 21/00; G01N 35/08; C02F 1/00
(52) U.S. Cl. .................... 700/266; 700/274; 436/55; 210/698; 210/696
(58) Field of Search ................ 700/266, 274; 205/775; 436/55; 422/3, 11, 18, 244; 435/262; 210/696, 697, 698, 745

(56) References Cited

U.S. PATENT DOCUMENTS

| 4,288,327 A | * | 9/1981 | Godlewski et al. | ......... 210/698 |
| 4,457,847 A | * | 7/1984 | Lorenc et al. | ............. 210/698 |
| 5,041,386 A | | 8/1991 | Pierce et al. | .................. 436/50 |
| 5,282,379 A | | 2/1994 | Harder et al. | ............... 73/29.01 |
| 5,320,967 A | | 6/1994 | Avallone et al. | ............... 436/50 |
| 5,527,468 A | * | 6/1996 | Boyette et al. | ............. 210/698 |
| 5,736,405 A | | 4/1998 | Alfano et al. | ................. 436/55 |
| 6,068,012 A | | 5/2000 | Beardwood et al. | .................... |

* cited by examiner

*Primary Examiner*—William Grant
*Assistant Examiner*—Sheela S Rao
(74) *Attorney, Agent, or Firm*—Margaret M. Brumm; Thomas M. Breininger

(57) ABSTRACT

Described and claimed is a method of controlling a boiler in which control is based on information from a control Matrix applicable to the specific parameters of the boiler. The control matrices include (a) Polymer Based All-in-One Product; (b) Residual Phosphate Polymer Product with Scavenger and Condensate Corrosion Inhibitor Fed Separately; (c) pH/Phosphate Product with Polymer, Scavenger, and Condensate Corrosion Inhibitor Fed Separately; (d) All-Polymer Product with Separate Scavenger and Condensate Corrosion Inhibitor Fed Separately; and (e) pH/Phosphate Polymer Product with Scavenger and Condensate Corrosion Inhibitor Fed Separately.

1 Claim, 10 Drawing Sheets

FIG. 1A

Matrix for a Polymer Based All-in-One Product
(with scavenger and condensate corrosion inhibitor)

| Item Condition | Detrimental Effect Produced | TREATMENT ACTIVES CONSUMPTION | | |
| --- | --- | --- | --- | --- |
| | | BD Polymer | FW Scavenger | Condensate Corrosion |
| A  Loss of Product Feed (or increase in steam load) | scale & corrosion | 1 | 1 | 1 |
| B  Overfeed of Product (or decrease in steam load) | corrosion | 0 | 0 | 0 |
| C  Low Cycles of Concentration | waste of BD energy & water | -1 | 0 | 0/-1 |
| D  High Cycles of Concentration | scale | 1 | 0 | 0 |
| E  Increase dissolved oxygen <50 ppb | corrosion | 0 | 1 | 0 |
| F  Increased dissolved oxygen > 50 -100 ppb | corrosion & scale | 1 | 1 | 0 |
| G  Increased carbonate loading in FW | condensate corrosion | 0 | 0 | 1 |
| H  Increased particulate loading in FW | scale | 1 | 0 | 0 |
| I   Process leak (non-hardness) | scale | 0? | 0? | 0? |
| J  Process leak | corrosion | 0? | 0? | 1 |
| K  Boiler Foaming or Carry-Over | deposits on turbine/super heater | 0 | 0 | 0 |
| L  Excessive hardness in FW (leak) | scale | 1 | 0 | 0 |
| Z  Performance as Expected / Desired | none | 0 | 0 | 0 |

? - although generally no change should be noticed, certain types of events may cause a positive or negative change in actives consumption

FIG. 1B

Matrix for a Polymer Based All-in-One Product
(with scavenger and condensate corrosion inhibitor)

| Item | Corrective Action(s) | Feedwater Classic tracer | Boiler water Classic tracer | Condensate Classic tracer |
|---|---|---|---|---|
| A | increase treatment dose, fix pump, fill tank with treatment, fix control equip. if necessary | decrease | decrease$^2$ | 0* |
| B | decrease treatment dose | increase | increase$^2$ | 0** |
| C | decrease blowdown mass flow rate | decrease$^1$ | decrease$^2$ | 0* |
| D | increase blowdown mass flow rate | increase$^1$ | increase$^2$ | 0** |
| E | fix air inleakage (pump, deaerator, condensate) and/or increase treatment dosage | 0 | 0 | 0 |
| F | fix air inleakage, feed supplemental scavenger, or increase treatment dose | 0 | 0 | 0 |
| G | fix air inleakage to condensate, vent condensate, dump condensate | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | ↑ |
| K | decrease boiler water level, increase blowdown | 0 | 0 | 0 |
| L | increase treatment dose, eliminate leak, fix pre-treatment process | 0 | 0 | 0 |
| Z | | n/a | | |

\* if carry-over exists - under this condition condensate classic tracer concentration will decrease
\*\* if carry-over exists - under this condition condensate classic tracer concentration will increase
$^1$ assumes manual treatment pump setting - no automatic control - with control no change in concentration expected
$^2$ assumes manual control of blowdown mass flow - no automatic control - with control no change in concentration expected
? - although generally no change should be noticed, certain types of events may cause a positive or negative change in actives consumption

FIG. 2A

Matrix for a Residual Phosphate Polymer Product with Scavenger and Condensate Corrosion Inhibitor Fed Separately

| | | | TREATMENT ACTIVES CONSUMPTION | | | |
|---|---|---|---|---|---|---|
| | | | BD Polymer | FW Scavenger | Condensate Corrosion | BD Phosphate |
| Item | Condition | Detrimental Effect Produced | | | | |
| A | Loss of Product Feed (or increase in steam load) | scale & corrosion | 1 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0/-1 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50 -100 ppb | corrosion & scale | 1 | 1 | 0 | 0 |
| G | Increased carbonate loading in FW | condensate corrosion | 0 | 0 | 1 | 0/1? |
| H | Increased particulate loading in FW | scale | 1 | 0 | 0 | 0 |
| I | Process leak (non-hardness) | scale | 0? | 0? | 0? | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 0 | 1 |
| Z | Performance as Expected / Desired | none | 0 | 0 | 0 | 0 |

? - although generally no change should be noticed, certain types of events may cause a positive or negative change in actives consumption

FIG. 2B

Matrix for a Residual Phosphate Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease² | 0* |
| B | decrease pump rate | increase | increase² | 0** |
| C | decrease blowdown rate | decrease¹ | decrease² | 0* |
| D | increase blowdown | increase¹ | increase² | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 0 |
| K | decrease boiler water level, increase blowdown | 0 | 0 | 1 |
| L | increase phosphate/polymer treatment dose, eliminate leak, fix pre-treatment process | 0 | 0 | 0 |
| N | n/a | | | |

\* if carry-over exists - under this condition condensate classic tracer concentration will decrease
\*\* if carry-over exists - under this condition condensate classic tracer concentration will increase
¹ assumes manual treatment pump setting - no automatic control - with control no change in concentration expected
² assumes manual control of blowdown mass flow - no automatic control - with control no change in concentration expected
? - although generally no change should be noticed, certain types of events may cause a positive or negative change in actives consumption

FIG. 3A

Matrix for a pH/Phosphate Product with Polymer, Scavenger, and Condensate Corrosion Inhibitor Fed Separately

| Item | Condition | Detrimental Effect Produced | BD Polymer | FW Scavenger | Condensate Corrosion | BD Phosphate |
|---|---|---|---|---|---|---|
| A | Loss of Product Feed (or increase in steam load) | scale & corrosion | 0 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50 -100 ppb | corrosion & scale | 1 | 1 | 0 | 0 |
| G | Increased carbonate loading in FW | condensate corrosion | 0 | 0 | 0/1? | 0/1? |
| H | Increased particulate loading in FW | scale | 1 | 0 | 0 | 0 |
| I | Process leak (non-hardness) | scale | 0? | 0? | 1 | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 1 | 1 |
| M | Phosphate Hideout | corrosion | 0 | 0 | 1 | 1 |
| N | Performance as Expected / Desired | none | 0 | 0 | 0 | 0 |

? - although generally no change should be noticed, certain types of events may cause a positive or negative change in actives consumption

FIG. 3B

Matrix for a pH/Phosphate Product with Polymer, Scavenger, and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease[2] | 0* |
| B | decrease pump rate | increase | increase[2] | 0** |
| C | decrease blowdown rate | decrease[1] | decrease[2] | 0* |
| D | increase blowdown | increase[1] | increase[2] | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | fix air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 1 |
| K | decrease boiler water level, increase blowdown | 0 | 0 | 0 |
| L | increase phosphate/polymer treatment dose, eliminate leak, fix pre-treatment process | 0 | 0 | 0 |
| M | do nothing to phosphate treatment feed, verify no hardness leak to FW | 0 | 0 | 0 |
| N | | n/a | 0 | 0 |

\* if carry-over exists - under this condition condensate classic tracer concentration will decrease
\*\* if carry-over exists - under this condition condensate classic tracer concentration will increase
[1] assumes manual treatment pump setting - no automatic control - with control no change in concentration expected
[2] assumes manual control of blowdown mass flow - no automatic control - with control no change in concentration expected
? - although generally no change should be noticed, certain types of events may cause a positive or negative change in actives consumption

FIG. 4A

Matrix for an All-Polymer Product with Scavenger
and Condensate Corrosion Inhibitor Fed Separately

| | | | TREATMENT ACTIVES CONSUMPTION | | |
|---|---|---|---|---|---|
| | | | BD Polymer | FW Scavenger | Condensate Corrosion |
| Item | Condition | Detrimental Effect Produced | | | |
| A | Loss of Product Feed (or increase in steam load) | scale & corrosion | 1 | 0 | 0 |
| B | Overfeed of Product (or decrease in steam load) | corrosion | 0 | 0 | 0 |
| C | Low Cycles of Concentration | waste of BD energy & water | -1 | 0 | 0/-1 |
| D | High Cycles of Concentration | scale | 1 | 0 | 0 |
| E | Increase dissolved oxygen <50 ppb | corrosion | 0 | 1 | 0 |
| F | Increased dissolved oxygen > 50 -100 ppb | corrosion & scale | 1 | 1 | 0 |
| G | Increased carbonate loading in FW | condensate corrosion | 0 | 0 | 1 |
| H | Increased particulate loading in FW | scale | 1 | 0 | 0 |
| I | Process leak (non-hardness) | scale | 1 | 0? | 0? |
| J | Process leak | corrosion | 0? | 0? | 1 |
| K | Boiler Foaming or Carry-Over | deposits on turbine/super heater | 0 | 0 | 0 |
| L | Excessive hardness in FW (leak) | scale | 1 | 0 | 0 |
| Z | Performance as Expected / Desired | none | 0 | 0 | 0 |

? - although generally no change should be noticed, certain types of events may cause a positive or negative change in actives consumption

FIG. 4B

Matrix for an All-Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase treatment dose, fix pump, fill tank with treatment, fix control equip. if necessary | decrease | decrease[2] | 0* |
| B | decrease treatment dose | increase | increase[2] | 0** |
| C | decrease blowdown mass flow rate | decrease[1] | decrease[2] | 0* |
| D | increase blowdown mass flow rate | increase[1] | increase[2] | 0** |
| E | fix air inleakage (pump, deaerator, condensate) and/or increase treatment dosage | 0 | 0 | 0 |
| F | fix air inleakage, feed supplemental scavenger, or increase treatment dose | 0 | 0 | 0 |
| G | fix air inleakage to condensate, vent condensate, dump condensate | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 1 |
| K | decrease boiler water level, increase blowdown | 0 | 0 | 0 |
| L | increase treatment dose, eliminate leak, fix pre-treatment process | 0 | 0 | 0 |
| N | n/a | | | |

\* if carry-over exists - under this condition condensate classic tracer concentration will decrease
\*\* if carry-over exists - under this condition condensate classic tracer concentration will increase
[1] assumes manual treatment pump setting - no automatic control - with control no change in concentration expected
[2] assumes manual control of blowdown mass flow - no automatic control - with control no change in concentration expected
? - although generally no change should be noticed, certain types of events may cause a positive or negative change in actives consumption

FIG. 5A

Matrix for a pH/Phosphate Polymer Product with Scavenger and Condensate Corrosion Inhibitor Fed Separately

| Item | Condition | Detrimental Effect Produced | BD Polymer | FW Scavenger | Condensate Corrosion | BD Phosphate |
|---|---|---|---|---|---|---|
| A | Loss of Product Feed (or increase in steam load) | scale & corrosion | 1 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50-100 ppb | corrosion & scale | 1 | 1 | 0 | 0 |
| G | Increased carbonate loading in FW | condensate corrosion | 0 | 0 | 0/1? | 0/1? |
| H | Increased particulate loading in FW | scale | 1 | 0 | 0 | 0 |
| I | Process leak | scale | 1 | 0? | 1 | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 1 | 1 |
| M | Phosphate Hideout | corrosion | 0 | 0 | 0 | 1 |
| Z | Performance as Expected / Desired | none | 0 | 0 | 0 | 0 |

? - although generally no change should be noticed, certain types of events may cause a positive or negative change in actives consumption

FIG. 5B

Matrix for a pH/Phosphate Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease² | 0* |
| B | decrease pump rate | increase | increase² | 0** |
| C | decrease blowdown rate | decrease¹ | decrease² | 0* |
| D | increase blowdown | increase¹ | increase² | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | fix air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 1 |
| K | decrease boiler water level, increase blowdown | 0 | 0 | 0 |
| L | increase phosphate/polymer treatment dose, eliminate leak, fix pre-treatment process | 0 | 0 | 0 |
| M | do nothing to phosphate treatment feed, verify no hardness leak to FW | 0 | 0 | 0 |
| N | | n/a | | |

\* if carry-over exists -under this condition condensate classic tracer concentration will decrease
\*\* if carry-over exists -under this condition condensate classic tracer concentration will increase
¹ assumes manual treatment pump setting - no automatic control - with control no change in concentration expected
² assumes manual control of blowdown mass flow - no automatic control - with control no change in concentration expected
? - although generally no change should be noticed, certain types of events may cause a positive or negative change in actives consumption

USE OF CONTROL MATRIX FOR BOILER CONTROL

FIELD OF THE INVENTION

This invention is in the field of Boilers and Steam Generating Systems. Specifically, it is in the field of control of boilers.

BACKGROUND OF THE INVENTION

In current industry practice, boilers are controlled in many different ways.

For example, to adjust the amount of boiler water treatment(s) added to minimize boiler corrosion, scale, or other problems, the following methods may be used.

Manual Control—boiler operators will manually change one or more of these items to vary the amount of treatment fed to a boiler: a positive displacement treatment pump stroke length (volume delivered per stroke), frequency of pump stroke (how many strokes per unit of time) for a positive displacement pump, the concentration of treatment active being delivered through a positive displacement pump. Also possible to vary is the selection of entirely different treatment program/product to be fed through the treatment pump(s). A limitation of manual control is that operator intervention and action is required to make a change in the targeted dosage (amount of) treatment added to the boiler.

U.S. Pat. No. 5,041,386 describes a method involving automated control with an inert tracer through use of a boiler treatment product containing a tracer known to be inert under boiler conditions. With this method the dosage of a treatment may be automatically controlled by feedback or feedforward control of the treatment pump stroke length and/or treatment pump stroke frequency. The use of this inert tracer is the preferred automatic control method of boiler treatment dosage known in practice today.

A limited type of automated control of a boiler is possible using mass flow meters by monitoring the amount of treatment fed to a boiler to the total boiler feedwater or steam mass flow rate and/or by measuring the amount of treatment mass flow rate. The amount of treatment chemical fed to a boiler may be automatically adjusted by changing the treatment pump stroke length and/or by changing the treatment pump stroke frequency. Calibration errors, long-term reliability, and service requirements of mass flow meters in this type of automatic control scheme make it typically less accurate and frequently result in poorer control than with the inert tracer based approach listed above.

To adjust the amount of boiler cycles of concentration the following actions may be used: for manual control, boiler operators will manually change one or more of the following items to vary the boiler cycles of concentration (described in U.S. Pat. No. 5,041,386). This method is conducted by using the following operating parameters:

Increase or decrease blowdown mass flow rate by changing the opening of the continuous blowdown valve.

Open the boiler bottom blowdown valve to decrease boiler cycles of concentration. This is almost always a discontinuous operation only done for short periods of time (seconds to minutes in length).

Increase or decrease the continuous blowdown sample flow rate to instruments and/or to the chemical analysis area to control the boiler cycles of concentration For automatic control of a continuously operating boiler in order to adjust the boiler cycles of concentration it is necessary to vary the blowdown mass flow rate. Varying the blowdown mass flow rate is typically done in one of the following ways:

Measure and control blowdown conductivity and/or total dissolved solids continuously and adjust the blowdown valve opening to control the amount of boiler water conductivity. To increase cycles of concentration, the blowdown valve is closed which reduces the continuous blowdown mass flow rate. To decrease the cycles of concentration, the valve is opened which increases the continuous blowdown mass flow rate. The conductivity (or total dissolved solids) may or may not be continuously measured in the boiler feedwater to provide a numeric value of cycles of concentration (Blowdown Conductivity divided by feedwater conductivity).

Measurement and control blowdown inert tracer concentration (U.S. Pat. No. 5,041,386) continuously by adjusting the blowdown valve opening to control the amount of boiler water tracer concentration is also practiced. To increase cycles of concentration, the blowdown valve is closed which reduces the continues blowdown mass flow rate. To decrease the cycles of concentration, the valve is opened which increases the continuous blowdown mass flow rate. The tracer concentration may or may not be continuously measured in the boiler feedwater to provide a numeric value of cycles of concentration (Blowdown tracer concentration divided by feedwater tracer concentration).

In some cases, the continuous control of cycles of concentration may be achieved by continuously measuring the blowdown mass flow rate. By comparing this mass flow rate versus the expected (targeted) total boiler feedwater, or by comparison to a continuously measured feedwater mass flow rate, the automatic adjustment of the continuous blowdown valve to control cycles can be achieved. Cycles of concentration is equal to the actual feedwater mass flow rate divided by the blowdown mass flow rate. Unfortunately, the accuracy of mass flow meters make this method many times less accurate in practice than the inert tracer method of automatic control listed above.

New methods of boiler control are always desirable.

SUMMARY OF THE INVENTION

The instant claimed invention is a method of controlling a boiler in which control is based on information from a control Matrix applicable to the specific operating parameters of said boiler comprising:

(i) providing a suitable fluorometer, sufficient analytical devices and a suitable controller;

(ii) programming said suitable fluorometer and controller using planning information from a control Matrix for boilers being treated with treatment programs selected from the group consisting of:

(a) Polymer Based All-in-One Product, (b) Residual Phosphate Polymer Product with Scavenger and Condensate Corrosion Inhibitor Fed Separately; and (c) ph/Phosphate Product with Polymer, Scavenger, and Condensate Corrosion Inhibitor Fed Separately;

(d) All-polymer Product with Separate Scavenger and Condensate Corrosion Inhibitor Fed Separately;

(e) pH/Phosphate Polymer Product with Scavenger and Condensate Corrosion Inhibitor Fed Separately;

(iii) using said fluorometer and sufficient suitable analytical devices to determine the status of system factors;

(iv) determining the pattern of changes in the readings from step (iii) over time;

(v) comparing the changes in readings in steps (iii) and (iv), with the patterns listed in the control Matrix to determine what corrective action(s) is recommended; and (vi) using said controller to automatically implement said corrective action(s).

BRIEF DESCRIPTION OF THE DRAWINGS

FIG. 1A and FIG. 1B are a control Matrix showing the control pattern for a boiler being treated with a Polymer Based All-in-One Treatment Product which also contains an oxygen scavenger and condensate corrosion inhibitor.

FIG. 2A and FIG. 2B are a control Matrix showing the control pattern for a boiler being treated with a—Residual Phosphate Polymer product when oxygen scavenger and condensate corrosion inhibitor treatments are fed separately.

FIG. 3A and FIG. 3B are a control Matrix showing the control pattern for a boiler being treated with a pH/Phosphate product which the polymer, oxygen scavenger, and condensate corrosion inhibitor are all fed separately. This regime could be applied also applied in boiler water treatment operations as either congruent, coordinated, equilibrium phosphate programs.

FIG. 4A and FIG. 4B are a control Matrix showing the control pattern for a boiler being treated with an all-polymer product with the oxygen scavenger and condensate corrosion treatments fed separately.

FIG. 5A and FIG. 5B are a control Matrix showing the control pattern for a boiler being treated with a pH/Phosphate product, which also contains polymer. The oxygen scavenger and condensate corrosion inhibitor are fed separately. This regime could also be applied in boiler water treatment operations as either congruent, coordinated, equilibrium phosphate programs.

DESCRIPTION OF THE PREFERRED EMBODIMENTS

Throughout this patent application the following terms have the indicated definitions:

Boiler is meant to include the term "steam generation system" as well as boiler;

FW means boiler feedwater;

COND means boiler condensate;

BD means boiler blowdown (same as boiler water);

Boiler cycles means boiler cycles of concentration;

Cycles means boiler cycles of concentration;

psig means pounds per square inch (gauge pressure);

Classic tracer for boilers is used to describe the use of an inert fluorescent tracer within a boiler (see U.S. Pat. No. 5,041,386 which describes and claims the use of Classic tracer in boiler systems).

Polymer Based All-in-One Product contains polymer, plus scavenger, plus condensate corrosion inhibitor in one treatment product.

The instant claimed invention is a method of controlling a boiler in which control is based on information from a control Matrix applicable to the specific operating parameters of said boiler comprising:

(i) providing a suitable fluorometer, sufficient analytical devices and a suitable controller;

(ii) programming said suitable fluorometer and controller using planning information from a control Matrix for boilers being treated with treatment programs selected from the group consisting of:

(a) Polymer Based All-in-One Product;

(b) Residual Phosphate Polymer Product with Scavenger and Condensate Corrosion Inhibitor Fed Separately;

(c) ph/Phosphate Product with Polymer, Scavenger, and Condensate Corrosion Inhibitor Fed Separately;

(d) All-polymer Product with Separate Scavenger and Condensate Corrosion Inhibitor Fed Separately; and (e) pH/Phosphate Polymer Product with Scavenger and Condensate Corrosion Inhibitor Fed Separately;

(iii) using said fluorometer and sufficient suitable analytical devices to determine the status of system factors;

(iv) determining the pattern of changes in the readings from step (iii) over time;

(v) comparing the changes in readings in steps (iii) and (iv), with the information listed in the control Matrix to determine what corrective action(s) is recommended; and (vi) using said controller to automatically implement said corrective action(s).

A suitable fluorometer and controller for use in conducting the method of the instant claimed invention is described and claimed in U.S. patent application Ser. No. 09/563,086 entitled, "MODULAR FLUOROMETER AND METHOD OF USING SAME TO DETECT ONE OR MORE FLUOROPHORES", filed May 1, 2000, now pending, herein incorporated by reference in its entirety. The fluorometer described and claimed therein is capable of measuring anywhere from one to sixteen separate fluorescent signals. The controller described therein is capable of using input from the fluorometer and other analytical devices, process this input according to program and apply control signals to the pumps and valves of a boiler.

The instant claimed method is a method to control a boiler in which control is based on information from a planned matrix applicable to the specific operating parameters of said boiler. FIGS. 1, 2, 3, 4, and 5 detail five specific control matrices and the fundamental logic needed to control a boiler system operating under either a residual phosphate, pH/phosphate, pH/phosphate with polymer, polymer all-in-one, or all-polymer treatment program. These five example programs would not be fed simultaneously. Rather, only one matrix would be used at one time.

For the example Matrices shown in FIGS. 1–5, conditions negatively impacting boiler or steam generation system performance are listed (items A through L on all plus item M on FIGS. 3 and 5). These Figures all use this code to signify the consumption pattern of the indicated material. Consumption is predicted by the symbol "1", where "0" is listed where no change in consumption should occur. A "−1" symbol is listed for conditions where a decrease in consumption should be noted.

Sufficient analytical devices are the number of analytical devices required to analyze those system factors known to persons of ordinary skill in the art of boilers as being important. Those system factors include, but are not limited to:

pH;

Conductivity;

Oxidation-reduction potential or "ORP";

additional chemical monitors of water quality for such factors including, but not limited to, calcium, magnesium, total hardness, iron, copper, chloride, sulfate, aluminum, silica, alkalinity, ammonia, phosphate, turbidity, total suspended solids; process leaks;

non-fluorescent monitors of treatment actives such as dispersant polymer, molybdate, phosphate and phosphonates;

water temperatures;

process-side temperatures, taken at various places in the system to help determine exchanger efficiency and fouling;

treatment actives;

fluid flowrates;

fluid velocities;

fluid pressures and differential pressures;

chemical inventories and depletion thereof;

pumping rates;

blowdown rates;

makeup water flowrate;

corrosion monitors;

fouling/deposit monitors; and light absorbance of substances in water.

Analytical devices capable of monitoring the above-described factors are known in the area of boilers and steam generation system.

In FIG. 1, the polymer all-in-one product scheme, Active tracer monitoring would be performed on the BD polymer, FW scavenger, and condensate corrosion treatment. Consumption of each active component of the treatment program would be measured using standard fluorescent tracer analytical techniques (using a sufficient number of fluorometers to measure the fluorescent signal of the inert tracer material (usually identified as "Classic tracer" for boilers) in the feed water and possibly within the condensate sample(s)). By evaluating each of these fluorescent signals and looking up the unique condition on the control matrix, a corrective step for the boiler control system to take would be automatically initiated or a recommendation would be communicated to the boiler operator for those corrective actions requiring manual intervention like maintenance and repair.

In FIG. 2, the residual phosphate polymer product scheme, Active tracer monitoring would be performed on the BD polymer, FW scavenger, BD phosphate, and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 3, the pH/phosphate product with polymer scheme, Active tracer monitoring would be performed on the BD polymer, FW scavenger, BD phosphate and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 4, the All-polymer product scheme, Active tracer monitoring would be performed on the BD polymer, FW scavenger, and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 5, the pH/phosphate product scheme, Active tracer monitoring would be performed on the BD polymer, FW scavenger, BD phosphate and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

Examples of Inert tracer ("Classic tracer for boilers") are 1,5 napthalenedisulfonic acid alkali neutralized, fluorescein, or other flurometric compound(s) known to be inert under the conditions of a boiler or steam generating system which it is fed to (see U.S. Pat. No. 5,041,386). The fluorescent spectrum of this inert tracer must be distinguishable from any or all other flurometric species in the boiler. Only one inert tracer (Classic tracer) would be fed to a boiler system at one time. Classic tracer for boilers is available under the trademark TRASAR® from Nalco Chemical Company, One Nalco Center, Naperville, Ill. 60563.

Examples of Actives Monitoring (Actives tracer) in BD is a polymer, capable of acting as a dispersant and/or chelating natural or synthetic polymer. It must be capable of being monitored by flurometric measurement tools or instruments on a continuous or semi-continuous (repetitive batch monitoring) basis. The fluorescent spectrum of this polymer must be distinguishable from any or all other fluormetric species in the boiler. Actives tracer for boilers is available under the trademark TRASAR® from Nalco Chemical Company, One Nalco Center, Naperville, Ill. 60563.

FW (feedwater) scavenger is an oxygen scavenger (reductant) capable of reducing dissolved oxygen concentrations found in the boiler system due to incomplete removal by mechanical means (deaeration) or through ingress through leaks, and/or system contamination from returned condensate. This scavenger must be capable of being monitored by flurometric measurement tools or instruments on a continuous or semi-continuous (repetitive batch monitoring) basis. By monitoring either the reduced state (active) of the oxygen scavenger or the oxidized (spent) form of the scavenger by fluorescence could be made to work in this invention. The fluorescent spectrum of this scavenger must be distinguishable from any or all other flurometric species in the boiler. Persons of ordinary skill in the art of boilers know Feedwater scavengers.

Condensate corrosion treatment is a treatment fed to limit or reduce the amount of corrosion in the steam/condensate system of a boiler. This treatment may or may not be volatile. It may or may not be a neutralizing amine (like cyclohexylamine), filming amine, or other filming inhibitor.

However, this treatment would be capable of being monitored by flurometric measurement tools or instruments on a continuous or semi-continuous (repetitive batch monitoring) basis. The fluorescent spectrum of this corrosion inhibitor must be distinguishable from any or all other flurometric species in the boiler. Persons of ordinary skill in the art of boilers know condensate corrosion treatment materials.

BD (blowdown—same as boiler water) Phosphate is a phosphate containing treatment fed to minimize mineral scale and/or to form a more easily removable mineral scale in a boiler or steam generating system. This treatment would be capable of being monitored by flurometric measurement tools or instruments on a continuous or semi-continuous (repetitive batch monitoring) basis. The fluorescent spectrum of this phosphate-based treatment must be distinguishable from any or all other flurometric species in the boiler. Persons of ordinary skill in the art of boilers know Blowdown phosphate materials.

It is known to persons of ordinary skill in the art of boilers that in the cases of the condensate corrosion treatment, FW scavenger, BD polymer, and BD Phosphate any one or all not naturally fluorescent under the conditions of the boiler or a boiler sample may be made fluorescent through the addition of a separate chemicals in the sample stream prior to introduction into a fluorometer. In a boiler system for the condensate corrosion inhibitor, an example of this detection technique can be found in U.S. Pat. No. 5,858,798 for the monitoring of treatment containing a primary neutralizing amine such as cyclohexylamine.

Actives consumption—if less than expected amount of the active component is found in the sample, it is said that the active is being consumed. If more than the expected amount of the active is present, an accumulation of active is noted. In many cases, the use of Classic tracer for boilers is required to determine the expected (target) actives concentration within the FW, Condensate, or Boiler (BD) sample.

The advantage of the matrix method of control is that it provides a comprehensive control scheme for a boiler.

The five boiler control Matrices depicted in FIGS. 1, 2, 3, 4 and 5 cover a significant portion of the possible water treatment scenarios for boiler and steam generation systems. It is likely other treatment programs could be controlled equally as well with variant matrices. One could imagine programs where products fed separately in one case, are combined with other products to reduce the total amount of feed points and feedpumps required. One such example is seen by comparing matrices in FIG. 1 and in FIG. 4. One can also imagine other treatment chemistries not listed by these example matrices having application for improved control by the method/invention described here. Some of these alternative treatments could include chelants, phosphonates, anti-foam chemistries (such as glycol), all-volatile-treatments for corrosion protection not just in the steam/condensate system, alkalinity sources (such as alkali), oxidizing agents (such as nitrate or nitrite), molybdate, and surfactants.

With regard to the conditions listed in the control Matrices, although these are important conditions to be considered by any control Matrix for boilers, other conditions generally known but seen only in limited types, limited markets, or in limited locales could also be added to these control Matrices with their responses to the actives consumption and Classic tracer concentration plotted.

The following example is intended to be illustrative of the present invention and to teach one of ordinary skill how to make and use the invention. This example is not intended to limit the invention or its protection in any way.

EXAMPLES

Example 1

Control of Boiler Using Matrix for a Polymer Based All-In-One Product (with Scavenger and Condensate Corrosion Inhibitor).

In a boiler or steam generating system a Polymer Based All-in-One product (with scavenger and condensate corrosion inhibitor) containing a polymer anti-scalant, an oxygen scavenger (reducing agent) and a neutralizing amine is being fed to the boiler system. The treatment also contains an inert tracer (Classic tracer for boilers for product dosage control, diagnostics, and as a reference point, available from Nalco Chemical Company, One Nalco Center, Naperville, Ill. 60563 (630) 305-1000). The boiler system may or may not need additional pH control from the separate feed of a caustic (sodium hydroxide) solution. The boiler system is controlled near or at the following conditions.

| | |
|---|---|
| pH in the boiler blowdown (boiler water) | 11.0 |
| total FW hardness (calcium + magnesium) as $CaCO_3$ | 0.8 ppm |
| total dissolved oxygen in the feedwater | 10 ppb |
| total carbon dioxide load to the steam | 2.0 ppm as $CaCO_3$ |
| boiler cycles of concentration | 20 |
| boiler operating pressure | 250 psig |

The water fed to the boiler also contains silica, "M-alkalinity", and small amounts of other dissolved ions. The dosage of the treatment and the concentration of active components (polymer, scavenger, and amine) are measured using either a fluorometer or a suitable analytical device. The fluorometer and controller used are the modular fluorometer and controller from U.S. patent application Ser. No. 09/563,086, entitled, "MODULAR FLUOROMETER AND METHOD OF USING SAME TO DETECT ONE OR MORE FLUOROPHORES", filed May 1, 2000, now pending.

Under typical operating conditions, the dosage of this all-in-one treatment program is controlled by using the inert tracer measurement. The consumption of each active is also measured by comparing the inert tracer concentration and the concentration of the active components.

A system upset occurred where a seal on the high pressure feedwater pump began to fail. Unfortunately, the boiler operators could not detect the failed seal simply by looking at the pump or by any other mechanical observation. The result of the seal failure is the ingress of oxygen into the boiler feedwater system prior to the injection of the feedwater to the boiler. During the upset the following conditions of the tracer and treatment actives measurements are noted.

DAY 1

No change in feedwater or condensate inert tracer concentration,

Increased consumption of the oxygen scavenger seen, and

No change in polymer or condensate consumption is noted.

FIG. 1 lists boiler system stresses where consumption is predicted by the symbol "1", where "0" is listed where no change in consumption should occur. A "−1" symbol is listed for conditions where a decrease in consumption should be noted. The same table lists potential corrective action for the control system to recommend when a particular set of system stresses are noted.

Based on the measured inert tracer and actives concentrations, the system provided a warning to the operators that possible air in-leakage (oxygen ingress) is suspected with the boiler system. This is likely an ingress of less than 50 to 100 ppb since no change in polymer consumption is being seen. The operators and water treatment service company work to find and begin installing additional oxygen monitoring tools to verify the in-leakage problem. In the meantime, the product treatment is increased to provide additional oxygen scavenger. A new baseline for scavenger consumption and tracer dosage is set.

By the next day, the same feedwater pump sealed is failing to even a greater extent letting in even more dissolved oxygen into the feedwater. Once again, the same FIG. 1 is used by the control system to evaluate the new tracer and treatment actives measurements.

DAY 2

No change in feedwater or condensate inert tracer concentration,

Increased consumption of the oxygen scavenger,

No change in condensate consumption is noted, and

An increase in polymer consumption is noted.

Now the polymer is being consumed as evident by the actives measurement. The stress to the boiler system is now changed to indicate an air in-leakage of greater than 100 ppb nominally. The increased dissolved oxygen lead to thermal decomposition of the organic polymer treatment which led to the increased polymer consumption. Loss of polymer means a direct loss of anti-scalant and possible scale deposition on the boiler internal surfaces. Treatment dosage is once again increased to cover for the ever increasing ingress of dissolved oxygen.

Later on this second day, an instrument specifically designed to measure boiler dissolved oxygen concentration is used to determine the oxygen concentration both upstream and downstream of the high pressure feedwater pump. Measurements show in fact that dissolved oxygen is increased by over 100 ppb across the feedwater pump. This confirms the likely seal problem and maintenance to the pump is scheduled.

Several days later. once the pump seal is replaced, dissolved oxygen levels decrease to normal values and no stress is found or indicated by the inert tracer and actives measurement/control system. Treatment dosage is returned to the original value as recommended for the standard boiler operating conditions.

As a result of the monitoring/control methods described in this example, significant oxygen corrosion damage to the pre-boiler and possibly even to the boiler itself are avoided through increasing the treatment dosage target. In addition, the monitoring with control method also limited scale formation through recommending a second dosage increase on day #2. The continued failure of the pump seal now threatens the proper dosage of anti-scalant polymer through oxidative thermal decomposition. This is compensated for by the second dosage increase. In addition, the controller communicates with maintenance personnel and provides them with assistance to identify the nature of the problem. This allows for timely completion of needed repairs and for the treatment dosage to be returned to its normal target value.

This example is intended to be illustrative of the present invention, and to teach one of ordinary skill how to make and use the invention. This example is not intended to limit the invention or its protection in any way.

What is claimed is:

1. A method of controlling a boiler in which control is based on information from a control Matrix applicable to the specific operating parameters of said boiler comprising:

(i) providing at least one fluorometer, one or more analytical devices and a controller;

(ii) programming said at least one fluorometer and controller using planning information from a control Matrix for boilers being treated with treatment programs selected from the group consisting of:
(a) Polymer Based All-in-One Product;
(b) Residual Phosphate Polymer Product with Scavenger and Condensate Corrosion Inhibitor Fed Separately;
(c) pH/Phosphate Product with Polymer, Scavenger, and Condensate Corrosion Inhibitor Fed Separately;
(d) All-Polymer Product with Separate Scavenger and Condensate Corrosion Inhibitor Fed Separately; and
(e) pH/Phosphate Polymer Product with Scavenger and Condensate Corrosion Inhibitor Fed Separately;

(iii) using said at least one fluorometer and said one or more analytical devices to determine the status of system factors;

(iv) determining the pattern of changes in the readings from step (iii) over time;

(v) comparing the changes in readings in steps (iii) and (iv), with the patterns listed in the control Matrix to determine what corrective action(s) is recommended; and (vi) using said controller to automatically implement said corrective action(s).

* * * * *